United States Patent
Ma et al.

(10) Patent No.: US 11,791,745 B1
(45) Date of Patent: Oct. 17, 2023

(54) ADAPTIVE CONTROL METHOD FOR MULTIPLE INVERTERS IN PARALLEL AND SYSTEM WITH MULTIPLE INVERTERS IN PARALLEL

(71) Applicant: SHENZHEN POWEROAK NEWENER CO., LTD, Shenzhen (CN)

(72) Inventors: Hui Ma, Shenzhen (CN); Wentao Cang, Shenzhen (CN); Xiangzhu Yin, Shenzhen (CN); Zhihua Guo, Shenzhen (CN)

(73) Assignee: SHENZHEN POWEROAK NEWENER CO., LTD, Shenzhen (CN)

( * ) Notice: Subject to any disclaimer, the term of this patent is extended or adjusted under 35 U.S.C. 154(b) by 0 days.

(21) Appl. No.: 18/307,087

(22) Filed: Apr. 26, 2023

(30) Foreign Application Priority Data

Aug. 3, 2022 (CN) .......................... 202210924527.8

(51) Int. Cl.
*H02M 7/493* (2007.01)
*H02J 3/48* (2006.01)

(52) U.S. Cl.
CPC .............. *H02M 7/493* (2013.01); *H02J 3/48* (2013.01)

(58) Field of Classification Search
CPC .................................. H02M 7/492; H02J 3/38
See application file for complete search history.

(56) References Cited

U.S. PATENT DOCUMENTS

| | | | |
|---|---|---|---|
| 5,193,054 A * | 3/1993 | Galloway | H02J 4/00 307/82 |
| 2006/0245221 A1 * | 11/2006 | Ohshima | H02M 7/53871 363/131 |
| 2015/0092462 A1 * | 4/2015 | Ohori | H02J 3/48 363/71 |
| 2019/0039163 A1 * | 2/2019 | Kawai | B23K 9/124 |

FOREIGN PATENT DOCUMENTS

| | | | |
|---|---|---|---|
| CN | 104092242 A | * | 10/2014 |
| CN | 104734202 A | | 6/2015 |
| CN | 106026744 A | * | 10/2016 |
| CN | 109167371 A | | 1/2019 |
| CN | 110071514 A | | 7/2019 |
| CN | 110460099 A | | 11/2019 |
| CN | 113824160 A | | 12/2021 |
| CN | 114567045 A | | 5/2022 |

* cited by examiner

*Primary Examiner* — Gary A Nash
(74) *Attorney, Agent, or Firm* — IPRO, PLLC; Na Xu

(57) ABSTRACT

An adaptive control method for multiple inverters in parallel and a system with multiple inverters in parallel. The method average distribute the active power of each inverter unit by means of acquiring state information of inverter units, adjusting a reference voltage output by each of the inverter units based on a deviation between the output active power and the average active power, which is calculated by the state information, re-acquiring the state information and calculating a voltage component difference and a current component difference between the inverter units based on the adjusted reference voltage, and then adaptively adjusting the virtual impedance of the slave inverter unit according to (Continued)

the voltage component difference and the current component difference so that the output impedance of the slave inverter unit and master inverter unit is matched.

8 Claims, 6 Drawing Sheets

ADAPTIVE CONTROL METHOD FOR MULTIPLE INVERTERS IN PARALLEL AND SYSTEM WITH MULTIPLE INVERTERS IN PARALLEL

CROSS-REFERENCE TO RELATED APPLICATIONS

The present application claims the benefit of and priority to Chinese Patent Application No. 202210924527.8, filed with the Chinese Patent Office on Aug. 3, 2022, titled "Adaptive Control Method and Device for Multiple inverters in parallel and System with Multiple inverters in parallel", which is hereby incorporated by reference in its entirety.

TECHNICAL FIELD OF THE INVENTION

The present application relates to the technical field of micro-grid, and in particular, relates to an adaptive control method and device for multiple inverters in parallel and a system with multiple inverters in parallel.

BACKGROUND OF THE INVENTION

In the technical field of micro-grid, the power capacity, flexibility and system redundancy of micro-grid is generally improved by parallel connection of multiple inverters; however, in the system with multiple inverters in parallel, how to realize accurate power distribution is a technical problem to be solved urgently.

In the prior art, most inverters running in parallel adopt droop control to realize reasonable power distribution, but distribution accuracy thereof is affected by physical parameters. Moreover, due to uncertainties such as the equivalent impedance of the inverters and the line impedance of the connecting lines (collectively called output impedance), the output power distribution of the system with inverters connected in parallel is unbalanced and the circulating current is excessively large.

SUMMARY OF THE INVENTION

A technical solution adopted by an embodiment of the present application is to provide an adaptive control method for multiple inverters in parallel, which includes the following steps: acquiring state information output by a master inverter unit and a slave inverter unit; calculating an active power output by each of the inverter units and an average active power according to the state information; adjusting a reference voltage output by each of the inverter units according to a deviation between the active power output by each of the inverter units and the average active power; based on the adjusted reference voltage, re-acquiring the state information output by each of the inverter units, and calculating a voltage component difference and a current component difference between the master inverter unit and the slave inverter unit; adaptively adjusting the virtual impedance of the slave inverter unit according to the voltage component difference and the current component difference so that the output impedance of the slave inverter unit matches the output impedance of the master inverter unit.

Preferably, the state information includes an output voltage and an output current of each of the inverter units, and the step of calculating the active power output by each of the inverter units and the average active power according to the state information includes:

performing Park's Transformation on the output voltage and the output current to obtain a q-axis component and a d-axis component of the output voltage and a d-axis component and a q-axis component of the output current, wherein the expression of Park's Transformation performed on the output voltage is:

$$\begin{bmatrix} U_{i,d} \\ U_{i,q} \end{bmatrix} = \begin{bmatrix} \cos\theta & \sin\theta \\ -\sin\theta & \cos\theta \end{bmatrix} \begin{bmatrix} u_i \\ u_{i,delay} \end{bmatrix}, i = 1, 2$$

wherein $u_i$ is the output voltage of each of the inverter units, $u_{i,delay}$ is a voltage signal delayed by a quarter of the power frequency period of $u_i$, $U_{i,d}$ is a d-axis component of $u_i$, and $U_{i,q}$ is a q-axis component of $u_i$;

the expression of Park's Transformation performed on the output current is:

$$\begin{bmatrix} I_{i,d} \\ I_{i,q} \end{bmatrix} = \begin{bmatrix} \cos\theta & \sin\theta \\ -\sin\theta & \cos\theta \end{bmatrix} \begin{bmatrix} i_i \\ i_{i,delay} \end{bmatrix}, i = 1, 2$$

wherein $i_i$ is the output current of each of the inverter units, $i_{i,delay}$ is a current signal delayed by a quarter of the power frequency period of $i_i$, $I_{i,d}$ is a d-axis component of $i_i$, and $I_{i,q}$ is a q-axis component of $i_i$;

calculating the output active power of each of the inverter units and the average active power based on the d-axis component and the q-axis component of the output voltage and the d-axis component and the q-axis component of the output current, wherein the equations for calculating the output active power of each of the inverter units and the average active power are:

$$P_i = \frac{U_{i,d}I_{i,d} + U_{i,q}I_{i,q}}{2}$$

$$P_{average} = \frac{P_1 + P_2}{2}$$

wherein $P_i$ is the output active power of each of the inverter units, and i=1,2; $P_{average}$ is the average active power of the master inverter unit and the slave inverter unit.

Preferably, the equation for calculating the reference voltage is:

$$U_i = U_0 + \left(k_{pu} + \frac{k_{iu}}{s}\right)(P_{average} - P_i);$$

wherein $U_0$ is a rated voltage amplitude, $k_{pu}$ is a ratio of the deviation, $k_{iu}$ is an integral coefficient of the deviation, $P_{average}$ is the average active power of the master inverter unit and the slave inverter unit, $P_i$ is the output active power of each of the inverter units, and i=1,2.

Preferably, the expressions of calculating the current component difference and the voltage component difference between the master inverter unit and the slave inverter unit are:

$$\Delta I_d = I_{2,d} - I_{1,d}$$

$$\Delta U_d = U_{2,d} - U_{1,d}$$

wherein $\Delta I_d$ is a d-axis current component difference, $I_{2,d}$ is a d-axis component of the output current of the slave inverter unit, $I_{1,d}$ is a d-axis component of the output current of the master inverter unit, $\Delta U_d$ is a d-axis voltage component difference, $U_{2,d}$ is a d-axis component of the output voltage of the slave inverter unit, and $U_{1,d}$ is a d-axis component of the output voltage of the master inverter unit.

Preferably, the virtual impedance includes a virtual resistance and a virtual inductive reactance:

the expression of the virtual resistance $R_v$ is:

$$R_v = \left(k_{pr} + \frac{k_{ir}}{s}\right)\Delta U_d = k_{pr}[U_{2,d}(k) - U_{1,d}(k)] + k_{ir}\sum_{n=0}^{k}[U_{2,d}(k) - U_{1,d}(k)]T_S$$

wherein $k_{pr}$ is an adjustment ratio of the d-axis voltage component difference, $k_{ir}$ is an integral coefficient of the d-axis voltage component difference, and $T_S$ is a sampling period.

the expression of the virtual inductive reactance $R_v$ is:

$$X_v = \left(k_{px} + \frac{k_{ix}}{s}\right)\Delta I_d = k_{px}[I_{2,d}(k) - I_{1,d}(k)] + k_{ix}\sum_{n=0}^{k}[I_{2,d}(k) - I_{1,d}(k)]T_S$$

wherein $k_{px}$ is an adjustment ratio of the d-axis current component difference, and $k_{ix}$ is an integral coefficient of the d-axis current component difference.

Preferably, the method further includes the following step before the step of acquiring the state information output by the master inverter unit and the slave inverter unit: inputting initial voltages with the same voltage phase angle to the master inverter unit and the slave inverter unit respectively.

Preferably, the method further includes:

during the adjustment of the reference voltage output by each of the inverter units according to the deviation between the output active power of each of the inverter units and the average active power, a target value of the reference voltage of the master inverter unit is:

$$U_{1,dref} = U_0 + \left(k_{pu} + \frac{k_{iu}}{s}\right)(P_{average} - P_1)$$

$$U_{1,qref} = 0$$

wherein $U_{1,dref}$ is a d-axis voltage component of the master inverter unit, $U_{1,qref}$ is a q-axis voltage component of the master inverter unit, $U_0$ is the rated voltage amplitude, $k_{pu}$ is the ratio of the deviation, $k_{iu}$ is the integral coefficient of the deviation, $P_{average}$ is the average active power of the master inverter unit and the slave inverter unit, and $P_1$ is the output active power of the master inverter unit.

in the deviation adjustment and virtual impedance adaptive adjustment according to the output active power of the slave inverter unit and the average active power, a target value of the reference voltage of the slave inverter unit is:

$$U_{2,dref} = U_0 + \left(k_{pu} + \frac{k_{iu}}{s}\right)(P_{average} - P_2) - I_{2,d}R_v + I_{2,q}X_v$$

$$U_{2,qref} = 0 - I_{2,q}R_v - I_{2,d}X_v$$

wherein $U_{2,dref}$ is a d-axis voltage component of the slave inverter unit, $U_{2,qref}$ is a q-axis voltage component of the slave inverter unit, $P_2$ is the output active power of the slave inverter unit, $R_v$ is a virtual resistance of the slave inverter unit, and $X_v$ is a virtual inductive reactance of the slave inverter unit.

Another technical solution adopted by an embodiment of the present application is to provide an adaptive control device for multiple inverters in parallel, which includes: an acquisition module, being configured to acquire state information output by a master inverter unit and a slave inverter unit; a first calculating module, being configured to calculate an active power output by each of the inverter units and an average active power according to the state information; a reference voltage adjusting module, being configured to adjust a reference voltage output by each of the inverter units according to a deviation between the active power output by each of the inverter units and the average active power; a second calculating module, being configured to re-acquire the state information output by each of the inverter units and calculate a voltage component difference and a current component difference between the master inverter unit and the slave inverter unit based on the adjusted reference voltage; an adaptive adjusting module, being configured to adaptively adjust the virtual impedance of the slave inverter unit according to the voltage component difference and the current component difference so that the output impedance of the slave inverter unit matches the output impedance of the master inverter unit.

Another technical solution adopted by an embodiment of the present application is to provide a system with multiple inverters in parallel, the system with multiple inverters in parallel includes: at least one master inverter unit; at least one slave inverter unit; and a control unit, including at least one processor; and a memory communicatively connected with the at least one processor; wherein the memory stores instructions executable by the at least one processor, and the instructions, when executed by the at least one processor, enable the at least one processor to execute the method described above.

Another technical solution adopted by an embodiment of the present application is to provide a non-transient computer-readable storage medium, the non-transient computer-readable storage medium stores computer-executable instructions which enable a computer to execute the method described above.

BRIEF DESCRIPTION OF DRAWINGS

One or more embodiments are illustrated by pictures in corresponding attached drawings, and this does not constitute limitation on the embodiments. Elements/modules and steps with the same reference numerals in the attached drawings are shown as similar elements/modules and steps, and the pictures in the attached drawings do not constitute scale limitation unless otherwise stated particularly.

DETAILED DESCRIPTION OF THE INVENTION

In order to make objectives, technical solutions and advantages of the present application clearer, the present application will be further described in detail hereinafter with reference to attached drawings and embodiments. It shall be appreciated that, the specific embodiments described herein are only used to explain the present application and are not used to limit the present application.

It shall be noted that, all features in the embodiments of the present application may be combined with each other without conflict, and all the combinations are within the scope claimed in the present application. In addition, although functional module division is made in the schematic diagrams of the device and logical sequences are shown in the flowchart diagrams, in some cases, the steps shown or described may be executed with module division and sequences different from those in the schematic diagrams of the device and the flowchart diagrams.

Unless otherwise defined, all technical and scientific terms used in this specification have the same meanings as commonly understood by those skilled in the art of the present application. The terms used in the specification of the present application are only for the purpose of describing specific embodiments, and are not intended to limit the present application. The term "and/or" used in this specification includes any and all combinations of one or more associated items listed.

Figure 1:
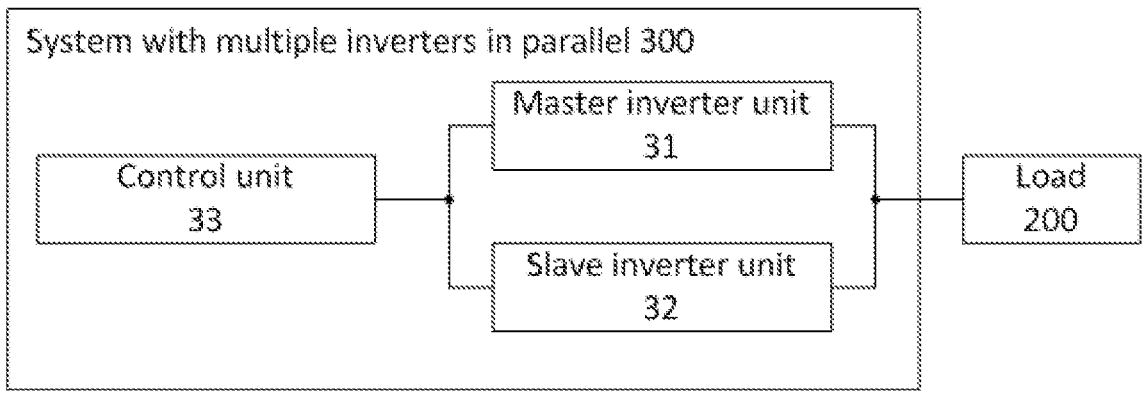
FIG. 1 is a schematic view of a system with multiple inverters in parallel according to an embodiment of the present application.

FIG. 1 is a schematic view of a system with multiple inverters in parallel according to an embodiment of the present application, the system 300 with multiple inverters in parallel includes at least one master inverter unit 31, at least one slave inverter unit 32 and a control unit 33. The master inverter unit 31 and the slave inverter unit 32 are connected in parallel, the master inverter unit 31 and the slave inverter unit 32 are communicatively connected to the control unit 33 respectively, and the master inverter unit 31 and the slave inverter unit 32 are also connected to a load 200. The control unit 33 is configured to control the operation of the master inverter unit 31 and the slave inverter unit 32, and is further configured to adjust reference voltages of the master inverter unit 31 and the slave inverter unit 32 as well as the virtual impedance of the slave inverter unit 32 in real time according to output state variables, so that equal distribution of reactive power is realized while equal distribution of the output active power output by the master inverter unit 31 and the slave inverter unit 32 to the load 200 is realized.

Figure 2:
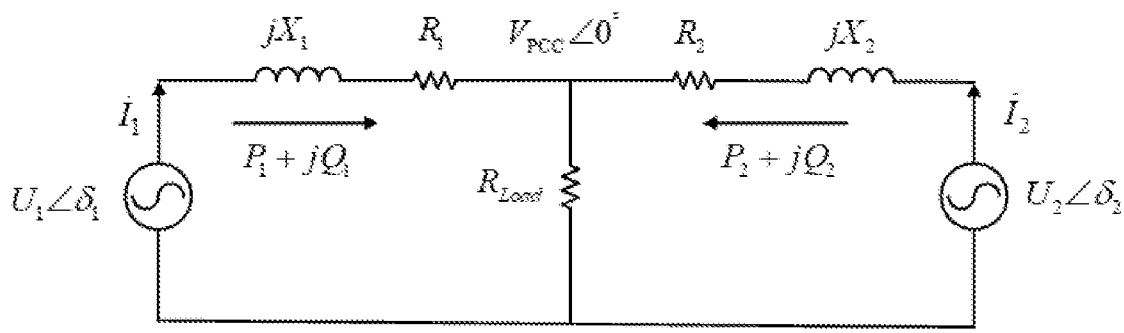
FIG. 2 is an equivalent schematic view of a system with multiple inverters in parallel according to an embodiment of the present application.

Specifically, please refer to FIG. 2 which is an equivalent schematic view of a system with multiple inverters in parallel provided according to an embodiment of the present application; as shown in FIG. 2, wherein $U1\angle\delta1$ and $U2\angle\delta2$ are output voltages of the master inverter unit and the slave inverter unit respectively, $\dot{I}_1$ and $\dot{I}_2$ are output currents of the master inverter unit and the slave inverter unit respectively, $jX1+R1$ and $jX2+R2$ are impedance of the master inverter unit and the slave inverter unit respectively, $P_1$ and $P_2$ are active power of the master inverter unit and the slave inverter unit respectively, Q1 and Q2 are reactive power of the master inverter unit and the slave inverter unit respectively, $VPCC\angle 0°$ is the terminal voltage of the parallel point, and RLoad is the load of the common terminal.

Figure 3:
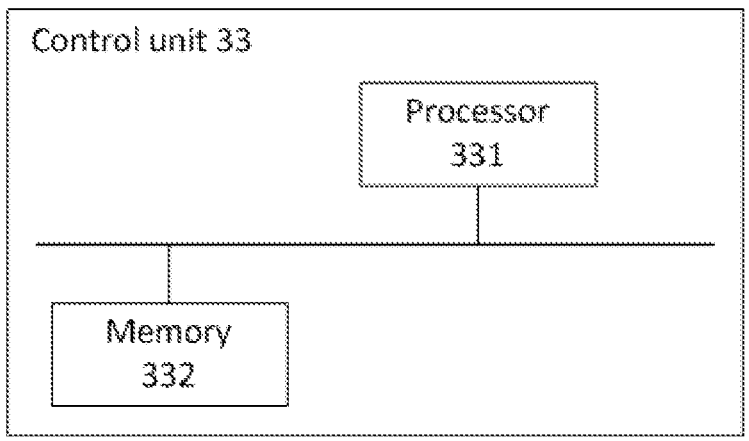
FIG. 3 is a schematic structural diagram of a control unit according to an embodiment of the present application.

FIG. 3 is a schematic structural diagram of a control unit according to an embodiment of the present application, and the control unit 33 includes: at least one processor 331, one processor 331 being taken as an example in FIG. 3; a memory 332 communicatively connected with the at least one processor 331, wherein the connection is achieved by bus connection as an example in FIG. 3.

The memory 332 stores instructions executable by the at least one processor 331, and the instructions are executed by the at least one processor 331 so that the at least one processor 331 can execute the adaptive control method for multiple inverters in parallel described below.

As a nonvolatile computer-readable storage medium, the memory 332 may be used to store nonvolatile software programs, nonvolatile computer-executable programs and modules, such as program instructions/modules corresponding to the adaptive control method for multiple inverters in parallel in the embodiment of the present application. The processor 331 executes various functional applications and data processing of the control unit 33, i.e., implements the adaptive control method for multiple inverters in parallel in the embodiment of the method described below, by running nonvolatile software programs, instructions and modules stored in the memory 332.

The memory 332 may include a program storage area and a data storage area, wherein the program storage area may store operating systems and application programs required by at least one function. In addition, the memory 332 may include a high-speed random access memory, and may also include a nonvolatile memory. For example, the memory 332 includes at least one magnetic disk memory device, flash memory device, or other nonvolatile solid-state memory devices. In some embodiments, the memory 332 optionally includes memories remotely provided relative to the processor 331.

The one or more modules are stored in the memory 332, and the one or more modules, when executed by the one or more processors 331, execute the adaptive control method for multiple inverters in parallel in any of the embodiments of the method described below, e.g., execute the steps of the method in FIG. 4 described below and realize functions of the modules in FIG. 7.

The system with multiple inverters in parallel described above may execute the method according to the embodiments of the present application, and have corresponding functional modules for executing the method. For technical details not described in detail in this embodiment, reference may be made to the method according to the embodiments of the present application.

Figure 4:
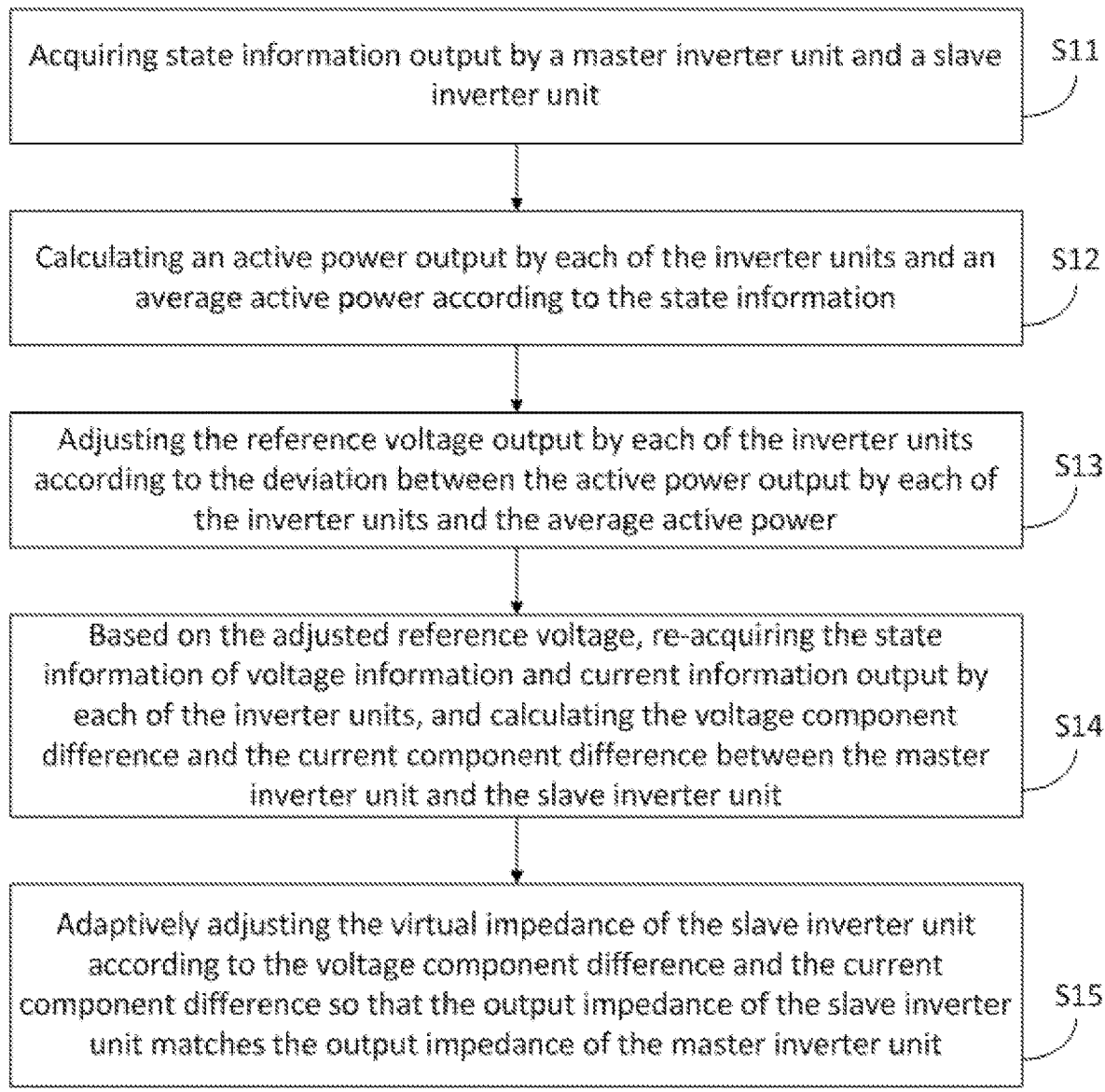
FIG. 4 is a flowchart diagram of an adaptive control method for multiple inverters in parallel according to an embodiment of the present application.

Please refer to FIG. 4 which is a flowchart diagram of an adaptive control method for multiple inverters in parallel according to an embodiment of the present application; as shown in FIG. 4, the method includes:

S11. acquiring state information output by a master inverter unit and a slave inverter unit:

The output state information includes the output voltage, the output current and the phase angle of the output voltage of the master inverter unit, as well as the output voltage, the output current and the phase angle of the output voltage of the slave inverter unit. The phase angle of the output voltage of the slave inverter unit is the same as that of the master inverter unit.

In some embodiments, before the master inverter unit and the slave inverter unit work, the control unit also needs to input initial voltages to the slave inverter unit and the master inverter unit so that the slave inverter unit and the master inverter unit start to work. Then, during the operation of the master inverter unit and the slave inverter unit, the control unit collects the output state information of the slave inverter unit and the master inverter unit. The phase angle of the initial voltage of the slave inverter unit is the same as that of the master inverter unit.

S12. calculating an active power output by each of the inverter units and an average active power according to the state information.

Specifically, the active power output by each of the inverter units includes the active power output by the master inverter unit and the active power output by the slave inverter unit. Firstly, Park's Transformation is performed on the output voltage and the output current of the slave inverter unit and the master inverter unit so as to obtain the d-axis voltage component and the q-axis voltage component as well as the d-axis current component and the q-axis current component corresponding to the slave inverter unit and the master inverter unit. Then the output active power of the master inverter unit is calculated based on the d-axis voltage component and the q-axis voltage component as well as the d-axis current component and the q-axis current component of the master inverter unit, and the output active power of the slave inverter unit is calculated based on the d-axis voltage component and the q-axis voltage component as well as the d-axis current component and the q-axis current component of the slave inverter unit. Finally, the average active power is calculated according to the output active power of the master inverter unit and the output active power of the slave inverter unit. By calculating the average active power of the master inverter unit and the slave inverter unit, the output active power of the slave inverter unit and the master inverter unit can be adjusted faster, thereby improving the adjustment speed of the system with multiple inverters in parallel.

The Park's Transformation is one of the most commonly used coordinate transformations used for analysis of operation of synchronous motors. The Park's Transformation is mainly used to project the three-phase currents of a, b and c of the stator in the synchronous motor onto the direct axis (d axis), the quadrature axis (q axis) and the zero axis perpendicular to the d and q plane which rotate along with the rotor, thereby realizing diagonalization of the inductance matrix of the stator, and simplifying the operational analysis of the synchronous motor. That is, the 'abc' coordinate system is transformed into the 'dq' coordinate system. Furthermore, through the Park's Transformation, the sine wave voltage and the sine wave current in the master inverter unit and the slave inverter unit, which are operating synchronously, are converted into the d and q coordinate system, thereby obtaining the DC magnitude of the voltage and current in the master inverter unit and the slave inverter unit.

Specifically, the expression of Park's Transformation performed on the output voltage is:

$$\begin{bmatrix} U_{i,d} \\ U_{i,q} \end{bmatrix} = \begin{bmatrix} \cos\theta & \sin\theta \\ -\sin\theta & \cos\theta \end{bmatrix} \begin{bmatrix} u_i \\ u_{i,delay} \end{bmatrix}, i = 1, 2$$

Wherein $u_i$ is the output voltage of each of the inverter units, $u_{i,delay}$ is a voltage signal delayed by a quarter of the power frequency period of $u_i$, $U_{i,d}$ is a d-axis component of $u_i$, $U_{i,q}$ is a q-axis component of $u_i$, and $\theta$ is the phase angle of the output voltage of the master inverter unit or the slave inverter unit. For example, when the i=1, the $U_{1,d}$ is the d-axis voltage component of the master inverter unit, and when the i=2, the U24 is the d-axis voltage component of the slave inverter unit.

The expression of Park's Transformation performed on the output current is:

$$\begin{bmatrix} I_{i,d} \\ I_{i,q} \end{bmatrix} = \begin{bmatrix} \cos\theta & \sin\theta \\ -\sin\theta & \cos\theta \end{bmatrix} \begin{bmatrix} i_i \\ i_{i,delay} \end{bmatrix}, i = 1, 2$$

Wherein $i_i$ is the output current of each of the inverter units, $i_{i,delay}$ is a current signal delayed by a quarter of the power frequency period of $i_i$, $I_{i,d}$ is a d-axis component of $i_i$, and $I_{i,q}$ is a q-axis component of $i_i$. For example, when i=1, the $I_{1,d}$ is the d-axis current component of the master inverter unit, and when i=2, the $I_{2,d}$ is the d-axis current component of the slave inverter unit.

The output active power of each of the inverter units and the average active power are calculated based on the d-axis component and the q-axis component of the output voltage as well as the d-axis component and the q-axis component of the output current, wherein the equations for calculating the output active power and the average active power are:

$$P_i = \frac{U_{i,d}I_{i,d} + U_{i,q}I_{i,q}}{2}$$

$$P_{average} = \frac{P_1 + P_2}{2}$$

Wherein $P_i$ is the output active power of each of the inverter units, and i=1,2; $P_{average}$ is the average active power of the master inverter unit and the slave inverter unit. The $P_1$ is the output active power of the master inverter unit, and the $P_2$ is the output active power of the slave inverter unit.

S13. adjusting the reference voltage output by each of the inverter units according to the deviation between the active power output by each of the inverter units and the average active power.

After acquiring the output active power of the master inverter unit and the slave inverter unit as well as the average active power, the deviation between the output active power of the master inverter unit and the average active power as well as the deviation between the output active power of the slave inverter unit and the average active power are calculated respectively. The deviation between the output active power and the average active power refers to the difference between the output active power and the average active power. For example, the power deviation of the master inverter unit is the difference between the average active power and the output active power of the master inverter unit.

The rated voltage amplitudes of the slave inverter unit and the master inverter unit are acquired, wherein the rated voltage amplitude of the master inverter unit is the same as the rated voltage amplitude of the slave inverter unit. Then the rated voltage amplitude is adjusted based on the power deviation of the master inverter unit and the power deviation of the slave inverter unit respectively, so as to obtain a first reference voltage of the master inverter unit and a second reference voltage of the slave inverter unit. The rated voltage amplitude is finely adjusted through the power deviation, so that when the master inverter unit and the slave inverter unit work according to the adjusted reference voltage, the output active power of the master inverter unit and the slave inverter unit is equal to the average active power, thereby realizing the accurate distribution of the output active power for the system with multiple inverters in parallel.

Figure 5A:
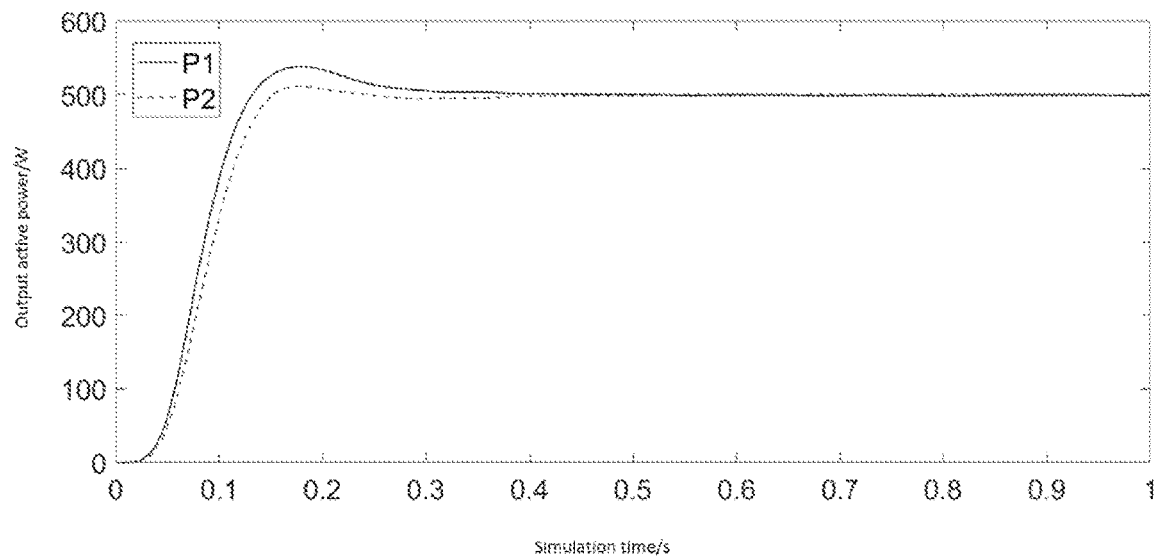
FIG. 5A is a result diagram of output active power of each of the inverter units according to an embodiment of the present application.

Specifically, the equation for calculating the reference voltage is:

$$U_i = U_0 + \left(k_{pu} + \frac{k_{iu}}{s}\right)(P_{average} - P_i) =$$

$$U_0 + k_{pr}[P_{average}(k) - P_i(k)] + k_{iu}\sum_{n=0}^{k}[P_{average}(k) - P_i(k)]T_S$$

Wherein $U_0$ is the rated voltage amplitude, $k_{pu}$ is the ratio of the deviation, $k_{iu}$ is the integral coefficient of the deviation, $T_S$ is the sampling period, $P_{average}$ is the average active power of the master inverter unit and the slave inverter unit, $P_i$ is the output active power of each of the inverter units, and i=1,2:

Please refer to FIG. 5A, which is a result diagram of output active power of each of the inverter units according to an embodiment of the present application. As can be known in FIG. 5A, when the master inverter unit and the slave inverter unit enter the steady state, the output active power of the master inverter unit is equal to that of the slave inverter unit.

S14. based on the adjusted reference voltage, re-acquiring the state information output by each of the inverter units, and calculating the voltage component difference and the current component difference between the master inverter unit and the slave inverter unit.

Specifically, in this embodiment, in the step of adjusting the reference voltage output by each of the inverter units according to the deviation between the active power output by each of the inverter units and the average active power, the reference voltage belongs to a process of real-time adjustment, and thus in the process of adjusting the reference voltage from a transient state to a steady state, the state information output by each inverter unit is collected in real time, and the voltage component difference and the current component difference between the master inverter unit and the slave inverter unit are calculated in real time.

After the rated voltage amplitude is adjusted according to the power deviation to obtain the first reference voltage and the second reference voltage, the first reference voltage is input to the master inverter unit, and the second reference voltage is input to the slave inverter unit, so that the master inverter unit works according to the first reference voltage, and the slave inverter unit works according to the second reference voltage. Then, when the master inverter unit and the slave inverter unit work, the state information of the master inverter unit and the state information of the slave inverter unit are re-acquired. Moreover, according to the state information, Park's Transformation is performed again on the output current and the output voltage of the master inverter unit as well as the output current and the output voltage of the slave inverter unit, thereby acquiring the d-axis voltage components and q-axis voltage components as well as the d-axis current components and the q-axis current components corresponding to the master inverter unit and the slave inverter unit. Finally, based on the d-axis voltage components and the d-axis current components of the master inverter unit and the slave inverter unit, the voltage component difference and the current component difference between the master inverter unit and the slave inverter unit are calculated.

Specifically, expressions of the current component difference and the voltage component difference are:

$$\Delta I_d = I_{2,d} - I_{1,d}$$

$$\Delta U_d = U_{2,d} - U_{1,d}$$

Wherein $\Delta I_d$ is the d-axis current component difference, $I_{2,d}$ is a d-axis component of the output current of the slave inverter unit, $I_{1,d}$ is a d-axis component of the output current of the master inverter unit, $\Delta U_d$ is the d-axis voltage component difference, $U_{2,d}$ is a d-axis component of the output voltage of the slave inverter unit, and $U_{1,d}$ is a d-axis component of the output voltage of the master inverter unit.

S15. adaptively adjusting the virtual impedance of the slave inverter unit according to the voltage component difference and the current component difference so that the output impedance of the slave inverter unit matches the output impedance of the master inverter unit:

When the system with inverters connected in parallel works at the reference voltage, the virtual impedance imposed onto the line impedance of the slave inverter unit is acquired, wherein the virtual impedance can solve the problem of uneven power distribution of the system with inverters connected in parallel. Then the virtual impedance of the slave inverter unit is adjusted according to the voltage component difference and the current component difference, so that the output impedance of the master inverter unit matches the output impedance of the slave inverter unit to make the reactive power of the master inverter unit equal to the reactive power of the slave inverter unit, thereby improving the effect of equal power distribution and improving the adjustment speed.

Specifically, the virtual impedance of the slave inverter unit includes a virtual resistance and a virtual inductive reactance, and the virtual resistance is adjusted according to the voltage component difference, and the virtual inductive reactance is adjusted according to the current component difference; finally, based on the virtual resistance and the virtual inductive reactance, equal distribution of reactive power is achieved among the slave inverter unit and the master inverter unit.

The expression of the virtual resistance $R_v$ is:

$$R_v = \left(k_{pr} + \frac{k_{ir}}{s}\right)\Delta U_d = k_{pr}[U_{2,d}(k) - U_{1,d}(k)] + k_{ir}\sum_{n=0}^{k}[U_{2,a}(k) - U_{1,d}(k)]T_S$$

Wherein $k_{pr}$ is the adjustment ratio of the d-axis voltage component difference, $k_{ir}$ is the integral coefficient of the d-axis voltage component difference, and $T_S$ is the sampling period;

the expression of the virtual inductive reactance $X_v$ is:

$$X_v = \left(k_{px} + \frac{k_{ix}}{s}\right)\Delta I_d = k_{px}[I_{2,d}(k) - I_{1,d}(k)] + k_{ix}\sum_{n=0}^{k}[I_{2,d}(k) - I_{1,d}(k)]T_S$$

Wherein $k_{pr}$ is the adjustment ratio of the d-axis current component difference, and $k_{ix}$ is the integral coefficient of the d-axis current component difference.

Figure 5B:
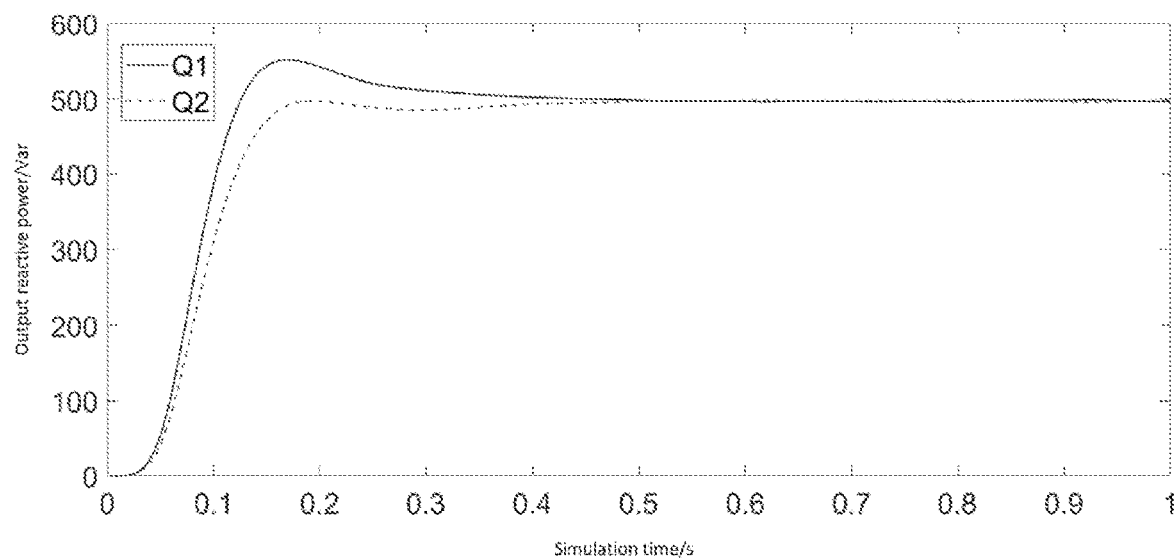
FIG. 5B is a result diagram of output reactive power of each of the inverter units according to an embodiment of the present application.

Please refer to FIG. 5B, which is a result diagram of output reactive power of each of the inverter units according to an embodiment of the present application. As shown in FIG. 5B, when the master inverter unit and the slave inverter unit enter the steady state, the output reactive power of the master inverter unit is equal to that of the slave inverter unit.

In some embodiments, when the system with multiple inverters in parallel enters the steady state, the input of the integrator is zero, and $P_1=P_2=P_{average}$ can be obtained according to the equation for calculating the reference voltage, and thus the equations can be derived as follow:

$$\frac{V_{PCC}(U_1 - V_{PCC})R_1}{R_1^2 + X_1^2} = \frac{V_{PCC}(U_2 - V_{PCC})R_2}{R_2^2 + X_2^2} \quad (1)$$

$$\frac{(U_1 - V_{PCC})R_1}{R_1^2 + X_1^2} = \frac{(U_2 - V_{PCC})R_2}{R_2^2 + X_2^2} \quad (2)$$

Due to uncertainties such as the offset of hardware characteristics of devices in the system with multiple inverters in parallel as well as different physical distances between inverters and PCCs, great difference exists between the output impedances of the two inverters, which will inevitably lead to $R_1 \neq R_2$ and $X_1 \neq X_2$. When the output impedance is mismatched, there is also great difference between the reactive powers output by the system with multiple inverters in parallel. In order to achieve equal distribution of the reactive power, the following equation should be satisfied:

$$\frac{V_{PCC}(U_1 - V_{PCC})X_1}{R_1^2 + X_1^2} = \frac{V_{PCC}(U_2 - V_{PCC})X_2}{R_2^2 + X_2^2} \quad (3)$$

The Equation (3) may be rewritten as:

$$\frac{(U_1 - V_{PCC})X_1}{R_1^2 + X_1^2} = \frac{(U_2 - V_{PCC})X_2}{R_2^2 + X_2^2} \quad (4)$$

The following equation can be obtained from the Equation (2):

$$\frac{(U_1 - V_{PCC})}{R_1^2 + X_1^2} = \frac{(U_2 - V_{PCC})}{R_2^2 + X_2^2} \times \frac{R_2}{R_1} \quad (5)$$

The following equation can be obtained by substituting Equation (5) into Equation (4):

$$\frac{(U_2 - V_{PCC})}{R_2^2 + X_2^2} \times \frac{R_2}{R_1} = \frac{(U_2 - V_{PCC})X_2}{R_2^2 + X_2^2} \quad (6)$$

The following equation can be obtained by simplifying the Equation (6):

$$\frac{R_2}{R_1} = \frac{X_2}{X_1} \quad (7)$$

As can be known from the above analysis: Equation (7) is the condition for realizing equal distribution of reactive power on the premise that the output active power is equally distributed among the two inverters. In particular, after the adaptive virtual impedance $Z_v = R_v + jX_v$ is introduced into the slave inverter unit, a sufficient condition for the Equation (7) to stand is making $R_2 + R_v = R_1$ and $X_2 + X_v = X_1$ by setting the values of $R_v$ and $X_v$ reasonably. It shall be noted that, the above Equations (1) to (7) are to prove the relationships between $Z_1$ and $Z_2$, so as to prove that the introduction of adaptive virtual impedance $Z_v$ to the slave inverter unit can achieve accurate distribution of reactive power $Q_i$.

In some embodiments, the outputs of the master inverter unit and the slave inverter unit are sine waves, and then the sine waves of the master inverter unit and the slave inverter unit are transformed into d and q axes based on the Park's Transformation so as to obtain the DC magnitude of the master inverter unit and the slave inverter unit, and then the output active power of the master inverter unit and the slave inverter unit as well as the average active power are calculated based on the DC magnitude. Furthermore, during the adjustment of the reference voltage output by each of the inverter units based on the deviation between the output active power of each of the inverter units and the average active power, a target value of the reference voltage of the master inverter unit is:

$$U_{1,dref} = U_0 + \left(k_{pu} + \frac{k_{iu}}{s}\right)(P_{average} - P_1)$$

$$U_{1,qref} = 0$$

Wherein $U_{1,dref}$ is a d-axis voltage component of the master inverter unit, $U_{1,qref}$ is a q-axis voltage component of the master inverter unit, U0 is the rated voltage amplitude, $k_{pu}$ is the ratio of the deviation, $k_{iu}$ is the integral coefficient of the deviation, $P_{average}$ is the average active power of the master inverter unit and the slave inverter unit, and $P_1$ is the output active power of the master inverter unit.

A target value of the reference voltage of the slave inverter unit is:

$$U_{2,dref} = U_0 + \left(k_{pu} + \frac{k_{iu}}{s}\right)(P_{average} - P_2) - I_{2,d}R_v + I_{2,q}X_v$$

$$U_{2,qref} = 0 - I_{2,q}R_v - I_{2,d}X_v$$

Wherein U2,dref is a d-axis voltage component of the slave inverter unit, $U_{2,qref}$ is a q-axis voltage component of the slave inverter unit, $P_2$ is the output active power of the slave inverter unit, $R_v$ is the virtual resistance of the slave inverter unit, and X, is the virtual inductive reactance of the slave inverter unit.

Figure 6A:
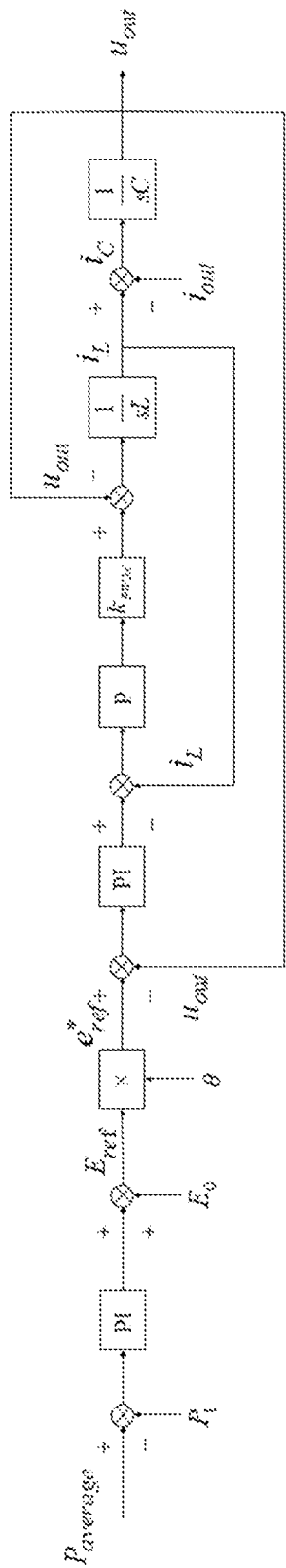
FIG. 6A is a schematic view of a control logic of a master inverter unit according to an embodiment of the present application.

In some embodiments, please refer to FIG. 6A, which is a schematic view of a control logic of a master inverter unit according to an embodiment of the present application. When the master inverter unit works, the output active power of the master inverter unit is subtracted from the average active power of the master inverter unit and the slave inverter unit, so as to obtain the deviation between the average active power and the output active power. Then, the deviation is calculated by a PI controller, and the calculated result is added with the rated voltage of the master inverter unit so as to obtain the reference voltage of the master inverter unit. Because the master inverter unit needs to output sinusoidal AC voltage, and the reference voltage is DC voltage, the reference voltage is multiplied by the phase angle to obtain sinusoidal AC voltage of the master inverter unit. Then the output voltage of the master inverter unit at the initial voltage is acquired, and the output voltage is subtracted from the sinusoidal AC voltage to obtain the voltage deviation. The output terminal of the master inverter unit further includes a filter capacitor and a filter inductor, the voltage collected on the filter capacitor is taken as the output voltage, and the current collected on the filter inductor is taken as the output current. Finally, the output current is adjusted based on the voltage deviation.

Figure 6B:
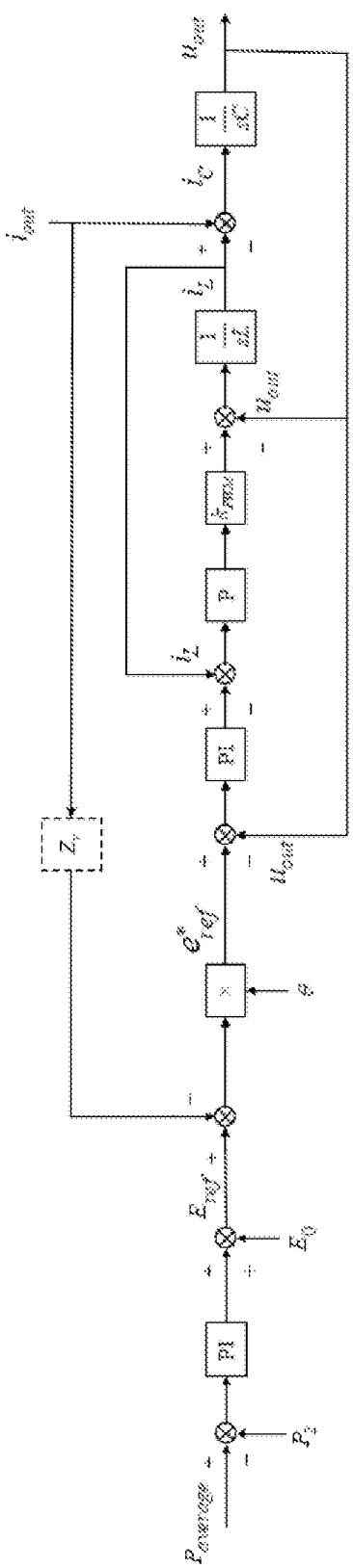
FIG. 6B is a schematic view of a control logic of a slave inverter unit according to an embodiment of the present application.

In some embodiments, please refer to FIG. 6B, which is a schematic view of a control logic of a slave inverter unit according to an embodiment of the present application. When the slave inverter unit works, the output active power of the slave inverter unit is subtracted from the average active power of the master inverter unit and the slave inverter unit, so as to obtain the deviation between the average active power and the output active power. Then, the deviation is calculated by a PI controller, and the calculated result is added with the rated voltage of the slave inverter unit so as to obtain the reference voltage of the slave inverter unit. However, when the master inverter unit and the slave inverter unit are connected to the load, the line impedance of the master inverter unit is inconsistent with that of the slave inverter unit due to factors such as inconsistent cable lengths, and thus equal distribution for the output reactive power and the output active power cannot be achieved. At this point, a virtual impedance is imposed onto the reference voltage of the slave inverter unit, so that the impedance of the master inverter unit is made equal to that of the slave inverter unit by adjusting the virtual impedance, thereby achieving the equal distribution of the output reactive power and the output active power. Then the reference voltage is multiplied by the phase angle to obtain the sinusoidal AC voltage of the slave inverter unit. Then, the output voltage of the slave inverter unit at the initial voltage is acquired, and the output voltage is subtracted from the sinusoidal AC voltage to obtain a voltage deviation, and the output current is adjusted based on the voltage deviation.

The embodiments of the present application provide an adaptive control method and device for multiple inverters in parallel and a system with multiple inverters in parallel, which achieve the equal distribution of the output active power among the master inverter unit and the slave inverter unit mainly by acquiring state information output by the master inverter unit and the slave inverter unit, then calculating the active power output by each of the inverter units and the average active power according to the state information, and adjusting the reference voltage output by each of the inverter units according to the deviation between the active power output by each of the inverter units and the average active power. Then, based on the adjusted reference voltage, the state information output by each of the inverter units is re-acquired and a voltage component difference and a current component difference between the master inverter unit and the slave inverter unit are calculated, then the virtual impedance of the slave inverter unit is adaptively adjusted according to the voltage component difference and the current component difference so that the output impedance of the slave inverter unit matches the output impedance of the master inverter unit, and thus the equal distribution of reactive power among the master inverter unit and the slave inverter unit is achieved while reducing the calculation amount and increasing the adjustment speed, thereby reducing the circulating current in the system with multiple inverters in parallel.

Figure 7:
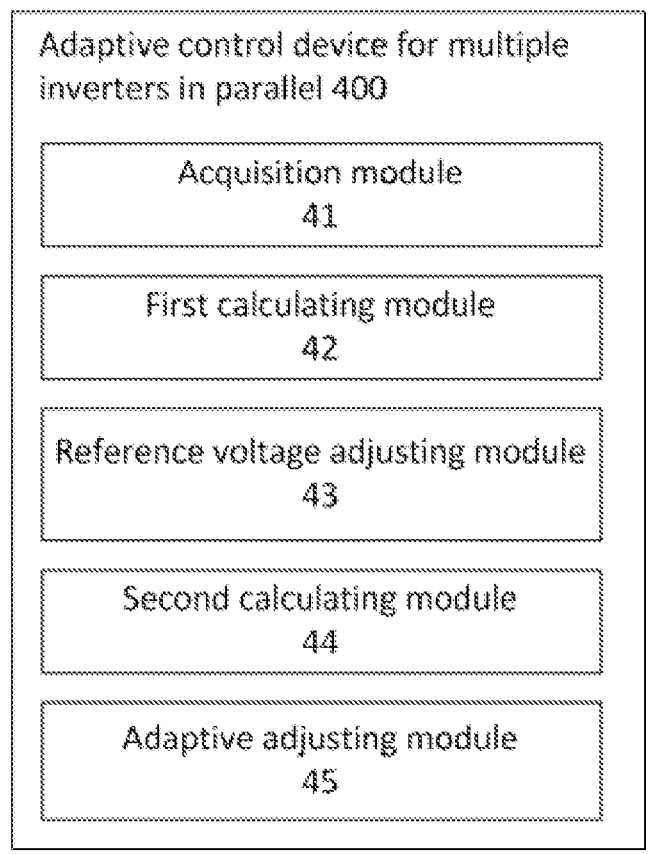
FIG. 7 is a structural block diagram of an adaptive control device for multiple inverters in parallel according to an embodiment of the present application.

Please refer to FIG. 7, which is a structural block diagram of an adaptive control device for multiple inverters in parallel according to an embodiment of the present application; as shown in FIG. 7, the adaptive control device 400 for multiple inverters in parallel includes an acquisition module 41, a first calculating module 42, a reference voltage adjusting module 43, a second calculating module 44 and an adaptive adjusting module 45.

The acquisition module 41 is configured to acquire state information output by a master inverter unit and a slave inverter unit.

The first calculating module 42 is configured to calculate an active power output by each of the inverter units and an average active power according to the state information.

The reference voltage adjusting module 43 is configured to adjust a reference voltage output by each of the inverter units according to a deviation between the active power output by each of the inverter units and the average active power.

The second calculating module 44 is configured to re-acquire the state information output by each of the inverter units and calculate a voltage component difference and a current component difference between the master inverter unit and the slave inverter unit based on the adjusted reference voltage.

The adaptive adjusting module 45 is configured to adaptively adjust the virtual impedance of the slave inverter unit according to the voltage component difference and the current component difference so that the output impedance of the slave inverter unit matches the output impedance of the master inverter unit.

It shall be noted that, the adaptive control device for multiple inverters in parallel described above can execute the adaptive control method for multiple inverters in parallel provided according to the embodiment of the present application, and has corresponding functional modules and beneficial effects for executing the method. For technical details not described in detail in the embodiment of the adaptive control device for multiple inverters in parallel, reference may be made to the adaptive control method for multiple inverters in parallel provided according to the embodiment of the present application.

An embodiment of the present application further provides a nonvolatile computer readable storage medium which stores computer executable instructions, and the computer executable instructions are executed by one or more processors to for example execute the steps of the method in FIG. 4 described above and realize the functions of the modules in FIG. 7.

The embodiments of the device described above are only for illustrative purpose, wherein the units illustrated as separate components may be or may not be physically separated, and components displayed as units may be or may not be physical units; that is, these units and components may be located in one place or distributed over multiple network units. Some or all of the modules may be selected according to actual needs to achieve the purpose of the solution of the embodiment.

From the description of the above embodiments, those of ordinary skill in the art may clearly appreciate that each embodiment may be realized by means of software plus a general hardware platform, and of course, it may also be realized by hardware. As shall be appreciated by those of ordinary skill in the art, the implementation of all or part of the processes in the embodiments of the method described above may be completed by instructing related hardware through a computer program, the program may be stored in a computer readable storage medium, and the program may include the processes of the embodiments of the method described above when it is executed. The storage medium may be a magnetic disk, an optical disk, a Read-Only Memory (ROM) or a Random Access Memory (RAM) or the like.

Finally, it shall be noted that, the above embodiments are only used to illustrate the technical solutions of the present application, and are not intended to limit the present application; under the idea of the present application, technical features in the above embodiments or different embodiments may also be combined, the steps may be implemented in any order, and many other variations in different aspects of the present application as described above are possible, and these variations are not provided in details for conciseness; although the present application has been described in detail with reference to the foregoing embodiments, those of ordinary skill in the art shall appreciate that, the technical solutions described in the foregoing embodiments may still be modified or some of the technical features may be equivalently replaced; and these modifications or replacements do not make the essence of the corresponding technical solutions deviate from the scope of the technical solutions of various embodiments of the present application.

The invention claimed is:

1. An adaptive control method for multiple inverters in parallel, comprising:
    acquiring state information output by a master inverter unit and a slave inverter unit;
    calculating an active power output by each of the inverter units and an average active power according to the state information;
    adjusting a reference voltage output by each of the inverter units according to a deviation between the active power output by each of the inverter units and the average active power;
    based on the adjusted reference voltage, re-acquiring the state information output by each of the inverter units, and calculating a voltage component difference and a current component difference between the master inverter unit and the slave inverter unit;
    adaptively adjusting the virtual impedance of the slave inverter unit according to the voltage component difference and the current component difference so that the output impedance of the slave inverter unit matches the output impedance of the master inverter unit;
    wherein the equation for adjusting the reference voltage is:

$$U_i = U_0 + \left(k_{pu} + \frac{k_{iu}}{s}\right)(P_{average} - P_i)$$

wherein $U_0$ is a rated voltage amplitude, $k_{pu}$ is a ratio of the deviation, $k_{iu}$ is an integral coefficient of the deviation, $P_{average}$ is the average active power of the master inverter unit and the slave inverter unit, $P_i$ is the output active power of each of the inverter units, and i=1,2.

2. The adaptive control method for multiple inverters in parallel according to claim 1, wherein the state information comprises an output voltage and an output current of each of the inverter units, and the step of calculating the active power output by each of the inverter units and the average active power according to the state information comprises:
    performing Park's Transformation on the output voltage and the output current to obtain a q-axis component and a d-axis component of the output voltage and a d-axis component and a q-axis component of the output current;
    wherein the expression of Park's Transformation performed on the output voltage is:

$$\begin{bmatrix} U_{i,d} \\ U_{i,q} \end{bmatrix} = \begin{bmatrix} \cos\theta & \sin\theta \\ -\sin\theta & \cos\theta \end{bmatrix} \begin{bmatrix} u_i \\ u_{i,delay} \end{bmatrix}, i = 1, 2$$

wherein $u_i$ is the output voltage of each of the inverter units, $u_{i,delay}$ is a voltage signal delayed by a quarter of the power frequency period of $u_i$, $U_{i,d}$ is a d-axis component of $u_i$, and $U_{i,q}$ is a q-axis component of $u_i$; $\vartheta$ is the phase angle of the output voltage of the master inverter unit or the slave inverter unit wherein the expression of Park's Transformation performed on the output current is:

$$\begin{bmatrix} I_{i,d} \\ I_{i,q} \end{bmatrix} = \begin{bmatrix} \cos\theta & \sin\theta \\ -\sin\theta & \cos\theta \end{bmatrix} \begin{bmatrix} i_i \\ i_{i,delay} \end{bmatrix}, i = 1, 2$$

wherein $i_i$ is the output current of each of the inverter units, $i_{i,delay}$ is a current signal delayed by a quarter of the power frequency period of $i_i$, $I_{i,d}$ is a d-axis component of $i_i$, and $I_{i,d}$ is a q-axis component of it;
    calculating the output active power of each of the inverter units and the average active power based on the d-axis component and the q-axis component of the output voltage and the d-axis component and the q-axis component of the output current, wherein the equations for calculating the output active power of each of the inverter units and the average active power are:

$$P_i = \frac{U_{i,d}I_{i,d} + U_{i,q}I_{i,q}}{2}$$

$$P_{average} = \frac{P_1 + P_2}{2}$$

wherein $P_i$ is the output active power of each of the inverter units, and i=1,2; $P_{average}$ is the average active power of the master inverter unit and the slave inverter unit.

3. The adaptive control method for multiple inverters in parallel according to claim 1, wherein the expressions of calculating the current component difference and the voltage component difference between the master inverter unit and the slave inverter unit are:

$$\Delta I_d = I_{2,d} - I_{1,d}$$

$$\Delta U_d = U_{2,d} - U_{1,d}$$

wherein $\Delta I_d$ is a d-axis current component difference, $I_{2,d}$ is a d-axis component of the output current of the slave inverter unit, $I_{1,d}$ is a d-axis component of the output current of the master inverter unit, $\Delta U_d$ is a d-axis voltage component difference, $U_{2,d}$ is a d-axis component of the output voltage of the slave inverter unit, and $U_{1,d}$ is a d-axis component of the output voltage of the master inverter unit.

4. The adaptive control method for multiple inverters in parallel according to claim 3, wherein the virtual impedance comprises a virtual resistance and a virtual inductive reactance:

the expression of the virtual resistance $R_v$ is;

$$R_v = \left(k_{pr} + \frac{k_{ir}}{s}\right)\Delta U_d = k_{pr}[U_{2,d}(k) - U_{1,d}(k)] + k_{ir}\sum_{n=0}^{k}[U_{2,d}(k) - U_{1,d}(k)]T_S$$

wherein $k_{pr}$ is an adjustment ratio of the d-axis voltage component difference, $k_{ir}$ is an integral coefficient of the d-axis voltage component difference, and $T_S$ is a sampling period;

the expression of the virtual inductive reactance $X_v$ is:

$$X_v = \left(k_{px} + \frac{k_{ix}}{s}\right)\Delta I_d = k_{px}[I_{2,d}(k) - I_{1,d}(k)] + k_{ix}\sum_{n=0}^{k}[I_{2,d}(k) - I_{1,d}(k)]T_S$$

wherein $k_{px}$ is an adjustment ratio of the d-axis current component difference, and $k_{ix}$ is an integral coefficient of the d-axis current component difference.

5. The adaptive control method for multiple inverters in parallel according to claim 1, wherein before the step of acquiring the state information output by the master inverter unit and the slave inverter unit, the adaptive control method further comprises:

inputting initial voltages with the same voltage phase angle to the master inverter unit and the slave inverter unit respectively.

6. The adaptive control method for multiple inverters in parallel according to claim 1, wherein the adaptive control method further comprises:

during the adjustment of the reference voltage output by each of the inverter units according to the deviation between the output active power of each of the inverter units and the average active power, a target value of the reference voltage of the master inverter unit is:

$$U_{1,dref} = U_0 + \left(k_{pu} + \frac{k_{iu}}{s}\right)(P_{average} - P_1)$$

$$U_{1qref} = 0$$

wherein $U_{1,dref}$ is a d-axis voltage component of the master inverter unit, $U_{1,qref}$ is a q-axis voltage component of the master inverter unit, $U_0$ is the rated voltage amplitude, $k_{pu}$ is the ratio of the deviation, $k_{iu}$ is the integral coefficient of the deviation, $P_{average}$ is the average active power of the master inverter unit and the slave inverter unit, and $P_1$ is the output active power of the master inverter unit;

during the deviation adjustment and virtual impedance adaptive adjustment according to the output active power of the slave inverter unit and the average active power, a target value of the reference voltage of the slave inverter unit is:

$$U_{2,dref} = U_0 + \left(k_{pu} + \frac{k_{iu}}{s}\right)(P_{average} - P_2) - I_{2,d}R_v + I_{2,q}X_v$$

$$U_{2,qref} = 0 - I_{2,q}R_v - I_{2,d}X_v$$

wherein $U_{2,dref}$ f is a d-axis voltage component of the slave inverter unit, $U_{2,qref}$ is a q-axis voltage component of the slave inverter unit, $P_2$ is the output active power of the slave inverter unit, $I_{2,d}$ is the d-axis current component of the slave inverter unit, $I_{2,d}$ is the q-axis current component of the slave inverter unit, $R_v$ is a virtual resistance of the slave inverter unit, and $X_v$ is a virtual inductive reactance of the slave inverter unit.

7. A system with multiple inverters in parallel, wherein the system with multiple inverters in parallel comprises:

at least one master inverter unit;

at least one slave inverter unit; and a control unit, comprising at least one processor; and a memory communicatively connected with the at least one processor; wherein the memory stores instructions executable by the at least one processor, and the instructions, when executed by the at least one processor, enable the at least one processor to execute the adaptive control method according to claim 1.

8. A non-transient computer-readable storage medium, wherein the non-transient computer-readable storage medium storing computer-executable instructions which enable a computer to execute the adaptive control method according to claim 1.

* * * * *